United States Patent
van der Veen et al.

(10) Patent No.: US 6,697,876 B1
(45) Date of Patent: Feb. 24, 2004

(54) DISTRIBUTED KERNEL OPERATING SYSTEM

(75) Inventors: Peter H. van der Veen, Kanata (CA); Dan T. Dodge, Ottawa (CA)

(73) Assignee: QNX Software Systems Ltd., Ontario (CA)

(*) Notice: Subject to any disclaimer, the term of this patent is extended or adjusted under 35 U.S.C. 154(b) by 0 days.

(21) Appl. No.: 09/382,563

(22) Filed: Aug. 25, 1999

(30) Foreign Application Priority Data

Aug. 26, 1998 (CA) .............................. 2245963

(51) Int. Cl.$^7$ ................................ G06F 9/44

(52) U.S. Cl. ...................... 709/313; 709/106

(58) Field of Search ................. 709/246, 314, 709/330, 203, 313, 106; 707/203, 101

(56) References Cited

U.S. PATENT DOCUMENTS

| | | | | |
|---|---|---|---|---|
| 5,428,803 A | | 6/1995 | Chen et al. | 395/800 |
| 5,617,568 A | * | 4/1997 | Ault et al. | 707/101 |
| 5,634,068 A | | 5/1997 | Nishtala et al. | 395/800 |
| 5,644,719 A | | 7/1997 | Aridas et al. | 395/200.12 |
| 5,652,885 A | | 7/1997 | Reed et al. | 395/651 |
| 5,734,898 A | * | 3/1998 | He | 707/203 |
| 5,745,759 A | | 4/1998 | Hayden et al. | 395/680 |
| 5,764,897 A | | 6/1998 | Khalidi | 395/200.31 |
| 5,768,511 A | * | 6/1998 | Galvin et al. | 709/203 |
| 5,790,530 A | | 8/1998 | Moh et al. | 370/363 |
| 6,061,740 A | * | 5/2000 | Ferguson et al. | 709/246 |
| 6,131,126 A | * | 10/2000 | Kougiouris et al. | 709/330 |
| 6,226,689 B1 | * | 5/2001 | Shah et al. | 709/314 |

OTHER PUBLICATIONS

Welsh, M. et al., "Incorporating Memory Management Into User–Level Network Interfaces" Department of Computer Science, Cornell University, 1997 Solid, "Server FAQ", Informational Web Page, http://www.solidtech.com/support/faq.htm, Aug. 1998.

Toomey W., Lecture—Interprocess Communication (IPC) and Synchronisation, May 1995.

Stanford.edu, "Interprocess Communication", Informational Web Page, http://www–dsg.stanford.edu/papers/cachekernel/subsection3_3_2.html, Aug. 1998.

Eicken, T., et al., "U–Net: A User–Level Network Interface For Parallel And Distrubuted Computing", Dec. 3–6, 1995.

Welsh, M. et al., "Shared–Memory Multiprocessor Support For Split–C", May 8, 1995.

Hollingsworth, J.K. et al., Dynamic Instumentation API (proposed) Revision 0.1, Oct. 2, 1996.

\* cited by examiner

*Primary Examiner*—Nabil El-Hady
*Assistant Examiner*—Jungwon Chang
(74) *Attorney, Agent, or Firm*—Squire, Sanders & Dempsey L.L.P.

(57) ABSTRACT

The present invention relates generally to networks of computer systems, and more specifically, to a method and system of distributed operating system over a network of computer systems. Existing distributed operating systems have performance limits due to multiple layers, distinctions between client and server abilities, and inflexible architectures. The invention presents a system and method of distributed operating system with a single level architecture which is just as easily applied to a flexible network environment, including an internet communication link, as to a stand-alone computer. This is done by use of a message passing operating system, and by sending off-node messages to network managers which are capable of directing and receiving the off-node messages.

18 Claims, 8 Drawing Sheets

Messages from this process are in bold.
Messages from another process are in *italics*.

DISTRIBUTED KERNEL OPERATING SYSTEM

The present invention relates generally to networks of computer systems, and more specifically, to a method and system of distributed operating system over a network of computer systems.

BACKGROUND OF THE INVENTION

In its simplest form, computer networking provides a mechanism for sharing files and peripheral devices among several interconnected computers. Ideally, a computer network should allow all computers and applications to have access to all the resources of the network, optimizing the collective resources.

The main responsibility of an operating system (OS) is to manage a computer's resources. All activities in the computer including scheduling application programs, writing files to disk, and sending data across a network, should function together as seamlessly and transparently as possible.

Some environments call for more rigorous resource management and scheduling than others. Real time applications, for instance, depend on the operating system to handle multiple events within fixed time constraints. The more responsive the OS, the greater flexibility a real time application has to meet its deadlines.

Typically, operating systems on computer networks are provided as multi-layer systems: one layer for the local environment, and a separate layer for the network environment. This results in two different operating systems having to be learned by developers and users. As well, because the interfaces with the local and network layers are significantly different, an application program may be written for one layer or the other, but can not be written to handle both. That is, network versions of application programs may not run on individual computers and stand-alone versions may not run on networks.

Typically, network software is designed to handle client computers and servers as distinctly different machines. If a user wishes to have a central computer provide files to a number of remote computers, then the central computer must be designated as a server, and the remote computers as clients. This generally limits the flexibilty of the network, because server and client computers are given different abilities by the operating system. For example, it is not possible for two computers to share files with one another because one must be designated as the server, and the other the client. Generally the server may not access files stored on the client.

Traditional computer network systems were designed and optimized to handle a narrowly defined set of resources and configurations. For example, the typical mainframe computer system would comprise a mainframe computer with a large memory storage area and set of printers. Smaller terminals or computers would access this mainframe as clients in a manner specific to the network and software. Such computer systems do not have the flexibility to exploit such new communication developments as the internet.

Because of the large software overheads of traditional operating systems, they can not be applied to smaller computer systems such as those found in automobiles or cellular phones.

Therefore, such operating systems are not appropriate for a broad range of applications including multiprocessor systems, palm top or laptop computers which may be integrated with other larger computers, cellular telephones, automobile controllers and smart process control instruments.

There is therefore a need for a method and system of a distributed operating system that addresses the problems outlined above. This design must be provided with consideration for reliability, speed of execution, and the volume of programming code required.

SUMMARY OF THE INVENTION

It is therefore an object of the invention to provide an improved distributed network operating system.

One aspect of the invention is broadly defined as a method of implementing a distributed operating system between a local client processor on a local network having a local message passing operating system and a local network manager and a remote server processor on a remote network having a remote message passing operating system and a remote network manager via a communication network interconnecting the local network and the remote network, comprising the steps of: the local message passing operating system responding to a message generated by the local client processor having an off-node destination by creating a connection between the local client processor and the local network manager; the local client processor transmitting the message to the local network manager via the connection; the local network manager transmitting the message and credentials of the local client processor to the remote network manager corresponding to the off-node destination via the communication network; and the remote network manager responding to an off-node message being received by forwarding a virtual message to the remote server.

BRIEF DESCRIPTION OF THE DRAWINGS

These and other features of the invention will become more apparent from the following description in which reference is made to the appended drawings in which.

DETAILED DESCRIPTION OF PREFERRED EMBODIMENTS OF THE INVENTION

Figure 1:
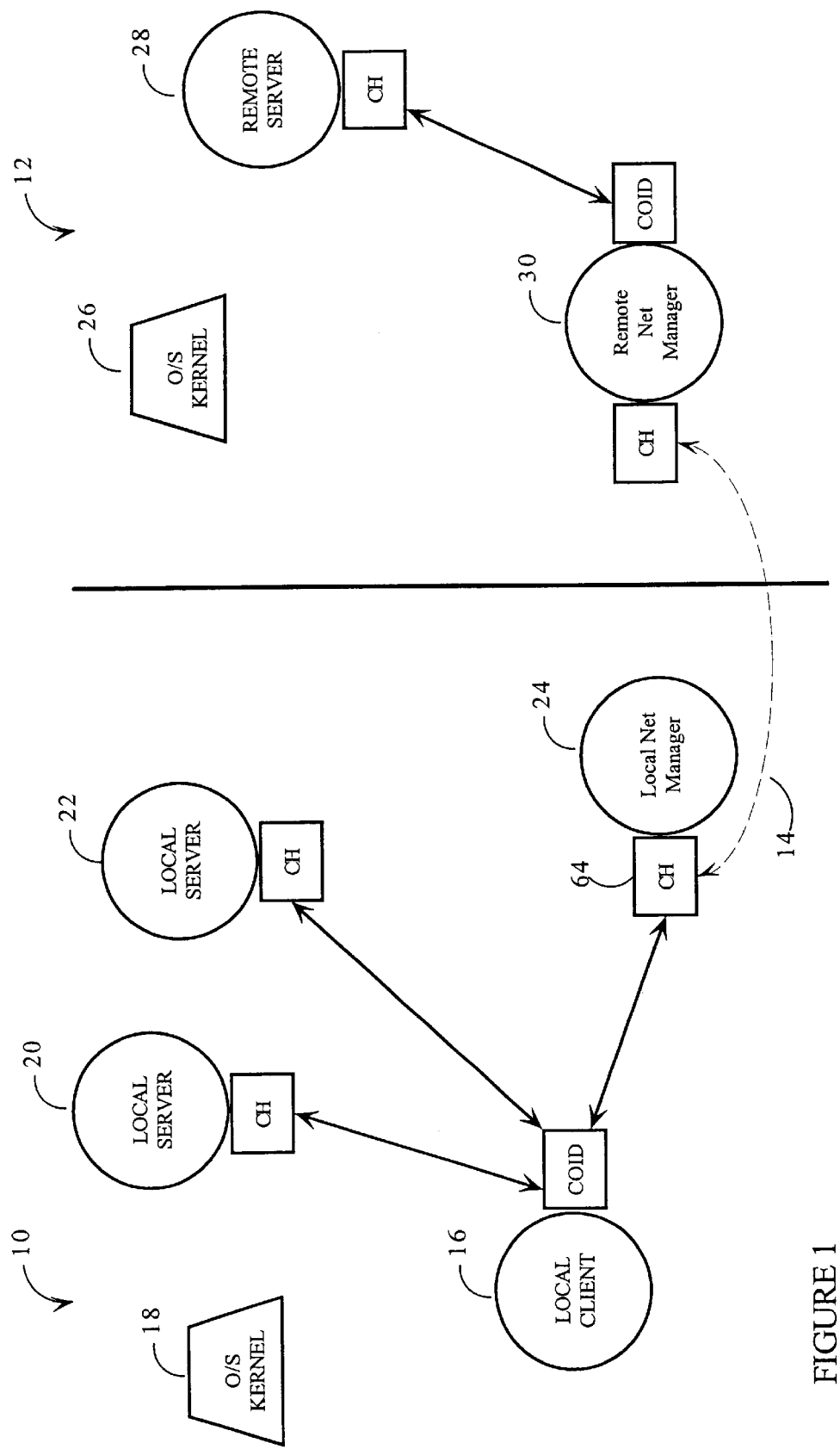
FIG. 1 presents a symbolic layout of the processing software in a manner of the invention.

The invention may be described with respect to a physical layout such as that of FIG. 1. This layout presents a local computer system 10 and a remote computer system 12, interconnected via a communication network 14. The limitations of the local computer system 10 and remote computer system 12 will become clear from the description that follows, but generally, the physical arrangement and electronic components of the systems are not a limitation of the invention. The particular layout presented is only intended as an example with which to describe the invention.

Similarly, the communication network 14 that allows message passing between the two computer systems 10 and 12, may also take on many physical forms and various communication protocols. As the data being passed between the two computer systems 10 and 12 are simply messages, they are independent of the media used to communicate them. Therefore, the type of communication network has little bearing on the invention.

The local computer system 10 of FIG. 1 includes a local client processor 16 which may execute application programs. It is able to communicate with the other devices in its local area via a local area network which may be implemented in a manner known in the art. These local devices may include a local message passing operating system 18, one or more local servers 20 and 22, and a local network manager 24.

The local message passing operating system 18 and local network manager 24 are software programs that are generally stored in an executable form on a computer readable medium such as a random access memory (RAM), read only memory (ROM), optical disk (CD-ROM) or magnetic storage medium (hard drive or portable diskette). Of course, the local operating system 18 and local network manager 24 could also be implemented by hardware means, or other means known in the art.

The local message passing operating system 18 is accessible to each of the local processors 16, 20 and 22. In addition to message passing as a means of interprocess control, this operating system generally provides such capabilities as data input and output, and timing services which are provided via external subroutines stored on similar memory media. Such implementations of message passing operating systems are known in the art. The message passing operating system handles communication between each of the processors 16, 20 and 22, and the local network manager 24 by setting up communication channels and connections between them.

The remote computer system 12 has a similar arrangement, including a message passing operating system kernel 26, a remote server 28, and a remote network manager 30. In this arrangement, the three devices shown, the message passing operating system kernel 26, remote server 28, and remote network manager 30, are free to communicate messages between one another via a message passing network, while the remote network manager 30 may communicate with the local network manager 24 via the communication network 14. The components of this remote network 12 will have similar features to the corresponding components in the local network 10.

Similar to the local network 10, the arrangement of the remote network 12 is intended only as an example with which to describe the invention. Clearly, an infinite number of arrangements may be created, which would be known to one skilled in the art. In the extreme, a network could comprise two processors on a single circuit board, interconnected so that they could communicate with one another.

Figure 2:
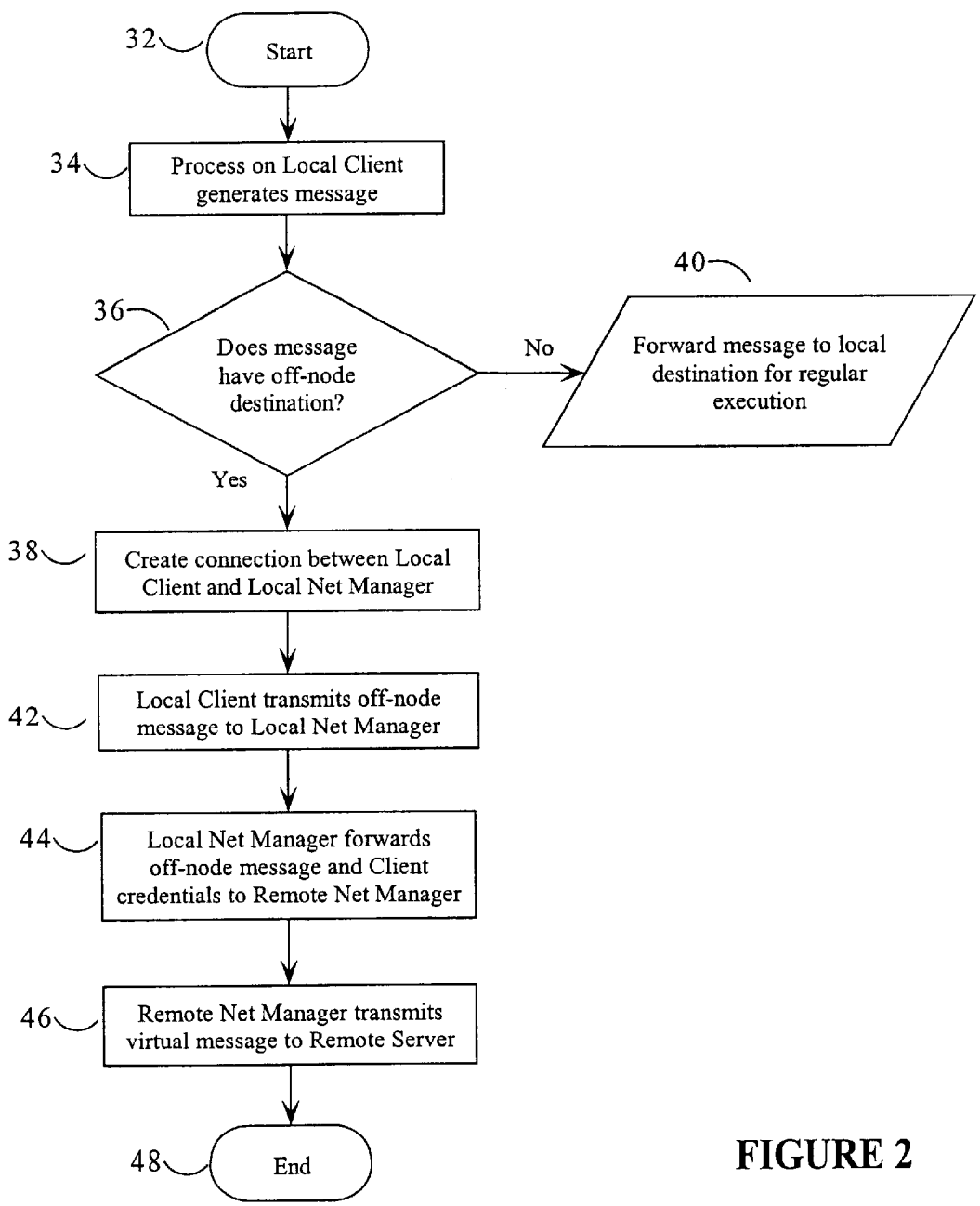
FIG. 2 presents a flow chart of the overall method in a broad manner of the invention.

A method which addresses the objects outlined above is presented as a flow chart in FIG. 2. This method of implementing a distributed operating system may be applied between a local client processor on a local network and a remote server on a remote network, where the local and remote networks are interconnected via a communication network. Generally, the local client processor will have access to a local message passing operating system and a local network manager, and similarly, the remote server will have access to a remote message passing operating system and a remote network manager.

Such an arrangement to implement this method would be similar to that of FIG. 1. The method starting at step 32 of FIG. 2 is shown in the form of a succinct flow chart in the interest of clarity. The method steps may clearly execute on different processors, sequentially or as part of other routines with additional steps. As well, changes could be made to the specific details of these steps to realize the invention, or to apply it to different applications.

The method comprises the local message passing operating system 18 responding to a message generated by the local client processor 16 at step 34 having an off-node destination identified at step 36, by creating a connection between the local client processor 16 and the local network manager 24 at step 38. If the message has an on-node address, then the message is handled in the regular manner at step 40. Once the channel has been created, the local client processor 16 may transmit the off-node message to the local network manager 24 at step 42, via the connection created at step 38. The local network manager 24 may now transmit the off-node message and credentials of the local client processor 16 to the remote network manager 30 corresponding to the off-node destination via the communication network, at step 44. The remote network manager 30 may now pass the off-node message being received by forwarding a virtual message to the remote server 28 at step 46. This ends the routine at step 48.

Broadly speaking, the method of the invention provides a distributed operating system which handles message passing from the local client processor to the remote server in two stages. The client side 10, essentially treats the local network manager 24 as an artificial server to the local client processor 16. Similarly, the remote network manager 24 generates virtual messages which it passes to the remote server 28; the remote network manager 30 acting like a client to the remote server 28.

To elaborate on this method, firstly, the local and remote operating systems 18 and 26 are known in the art as message passing operating systems. In the method of the invention, message passing is the fundamental means of interprocess control (IPC) throughout the entire system. A message is a packet of bytes passed from one process to another with no special meaning attached to the content of the message. The data in a message has meaning for the sender of the message and for its receiver, but for no one else.

Message passing not only allows processes to pass data to each other, but also provides a means of synchronizing the execution of several processes. As they send, receive, and reply to messages, processes undergo various "changes of state" that affect when and for how long, they may run. Knowing their states and priorities, the operating systems 18 and 26, can schedule all processes as efficiently as possible to optimize the available processor resources.

On the client side computer system 10, the application running on the Local client 16 must know the off-node address of the remote server 28. In an embodiment of the invention, the local kernel operating system 18 recognizes any message as off-node message when it does not have a corresponding local mapping for the node identification. In other words, the default is for the operating system 18 to consider unrecognized messages to be off-node, and to direct such messages to the Local Client's 16 connection to the local network manager 24.

The connection that is created at step 38 can not be described without a short review of threads and processes, both of which are known in the art.

A thread is a conveniently sized collection of programming steps that are scheduled and executed as a group. A process, on the other hand, can be thought of as a "container" for threads, defining the address space within which threads will execute. A process will always contain at least one thread.

Message passing is directed towards channels and connections, rather than targeted directly from thread to thread. A thread that wishes to receive messages first creates a channel, and another thread that wishes to send a message to that thread must first make a connection to that channel by "attaching" to the channel.

Channels are required by the message kernel calls and are used by servers to MsgReceivev( ) messages on. Connections are created by client threads to "connect" to the channels made available by servers. Once connections are established, clients can MsgSendv( ) messages over them. If a number of threads in a process all attach to the same channel, then the one connection is shared between all the threads. Channels and connections may be named within a process by a small integer identifier. Client connections may map directly into file descriptors.

A channel has three queues associated with it: one for threads waiting for messages, one for threads that have sent a message that hasn't yet been received, and one for threads that have sent a message that has been received, but not yet replied to. While in any of these queues, the waiting thread is blocked.

Figure 3:
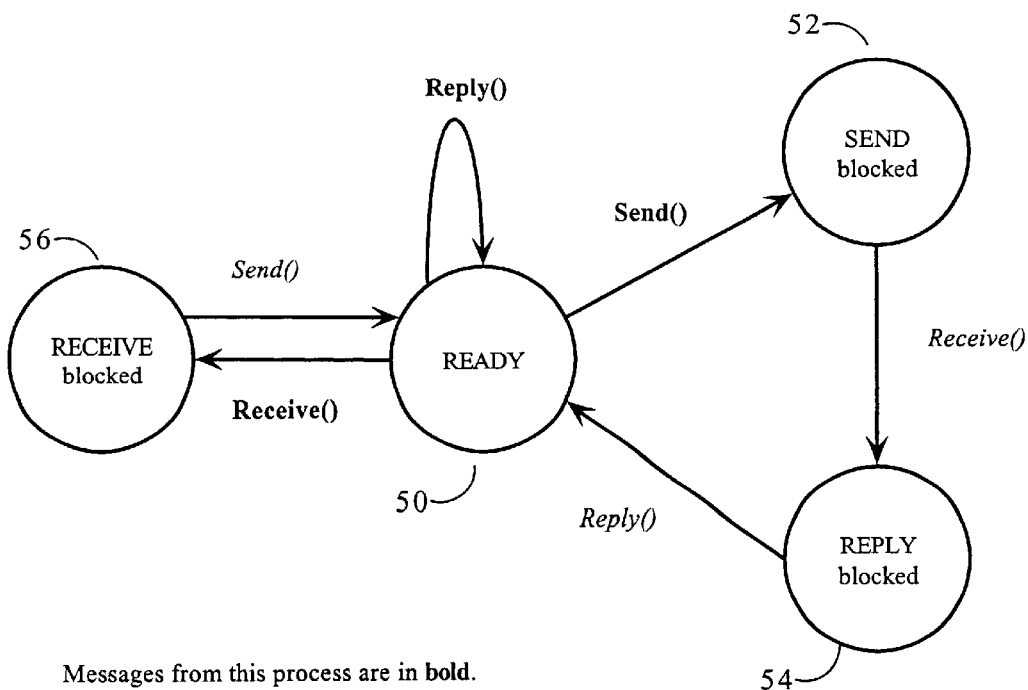
FIG. 3 presents a state diagram for message passing functions as known in the art.

This message blocking generally follows the state diagram of FIG. 3.

When a process isn't allowed to continue executing because it must wait for some part of the message protocol to end, the process is said to be blocked. Briefly, a thread that transmits a MsgSendv( ) to another thread, which could be within another process, will move from the Ready State 50 to the Send Blocked State 52 until the target thread transmits a MsgReceivev( ) back, putting the thread into a Reply Blocked State 54. Then, when the target thread has processed the message and transmitted a MsgReplyv( ), back to the originating thread, it returns to the Ready State 50. If a thread executes a MsgReceivev( ) without a previously sent message pending, it will be Receive Blocked 56 until the target thread transmits a MsgSendv( ) back to the originating thread. This blocking maintains the synchronized execution of the threads.

As will be described in more detail later, the client side 10 retains this blocking scheme, so threads are processed in the manner described above. In the preferred embodiment, this blocking scheme is modified on the server side 12 so threads are queued as they arrive to ensure proper sequence of execution.

Returning now to the method of the invention, the manner of implementing regular execution of threads per step 40 is well known in the art and will not be described herein. Various means of implementing the transmission of the message between the local client processor 16 and the local network manager 24 per step 42 would also be known to one skilled in the art. Clearly the invention is not limited to the transmission via the channels and connections discussed above.

It should be noted that the term "transmission" has been used to describe the transfer of a message from one device to another. The term is intended as a generalization and to prevent confusion with the message types "send" and "receive".

As noted above, the communication channel 14 between the local and remote network managers 24 and 30, may take a number of manners as known in the art, as only a message need be communicated. For example, the transmission of step 44 may be implemented using a TCP/IP protocol network.

Also as noted above, the remote network manager 30 wishes to present itself as a client to the remote server 28, at step 46. It does this by creating a virtual message, that is, a message created from the off-node message but directed back to the remote network manager 30, rather than to the local client processor 16. The remote network manager 30 keeps a record of the virtual messages it has created, so that it can return the response from the remote server 28 to the local network manager 24 as a properly addressed message that will be routed to the correct client processor on the client side 10. The routine is then completed at step 48.

As noted in the Background to the Invention, simple local area networking provides a mechanism for sharing files and peripheral devices among several interconnected computers. The method of the invention goes far beyond this simple concept and allows integration the entire network into a single, homogeneous set of resources.

Any process on any machine in the network can make use of any resource on any other machine. From the application program's perspective, there is no difference between a local or remote resource and no special facilities need to be built into applications to allow use of remote resources. In fact, an application program would need special code to be able to tell whether a resource such as a file or device resides on the local computer or on some other node on the network.

Users may access files anywhere on the network, take advantage of any peripheral device, and run applications on any machine on the network provided they have the appropriate authority. Processes can communicate in the same manner anywhere throughout the entire network.

The invention provides for a single layer operating system which allows seamless implementation of the local operating system in a network environment. This reduces the learning curve required of developers and users.

As well, the invention requires minimal code modifications for local application programs to be operated in the network environment. The minimal code changes result in little impact on the existing speed of execution, reliability and volume of programming code in the application program.

The software in the two network managers 24 and 30, is the same, and is not specific to either server or client. This allows each device to have the same privileges, and for access between the two networks to be bidirectional. This also allows greater flexibility of system configuration and allows greater optimization of the system resources.

The preferred embodiment of the invention will now be described, first with respect to the client side 10, and then with respect to the server side 12.

As far as the local client processor 16 is concerned, there is no difference between a connection through the Local Net Manager 24 to a remote server 28, and a connection to a same-node server such as 20 or 22, except perhaps a lower speed, depending upon the communication medium 14.

The Local Net Manager 24 component blocks the local client processor 16 as per normal messaging, and communicates the off-node message to the Remote Network Manager 30 on the specified remote node. When the two network Managers 24 and 30 have completed the message transaction using the Send/Receive/Reply sequence, the Local Net Manager 24 unblocks the local client processor 16.

Figure 4:
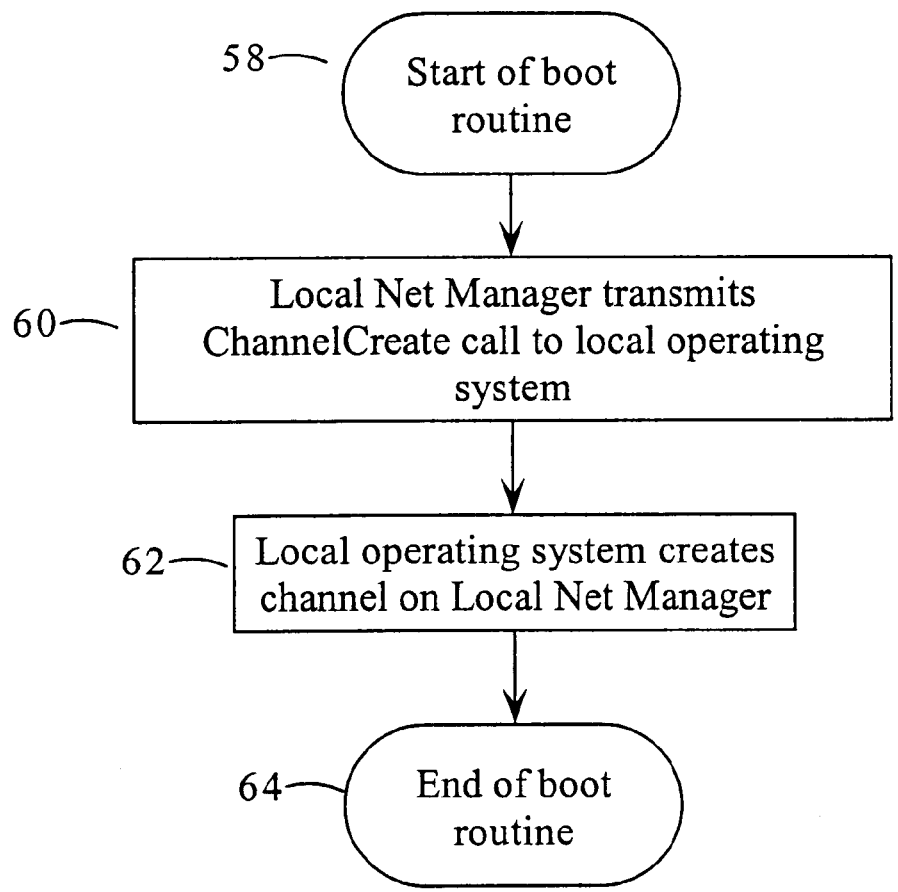
FIG. 4 presents a flow chart of the boot routine for the Client side method in the preferred embodiment of the invention.
Figure 5:
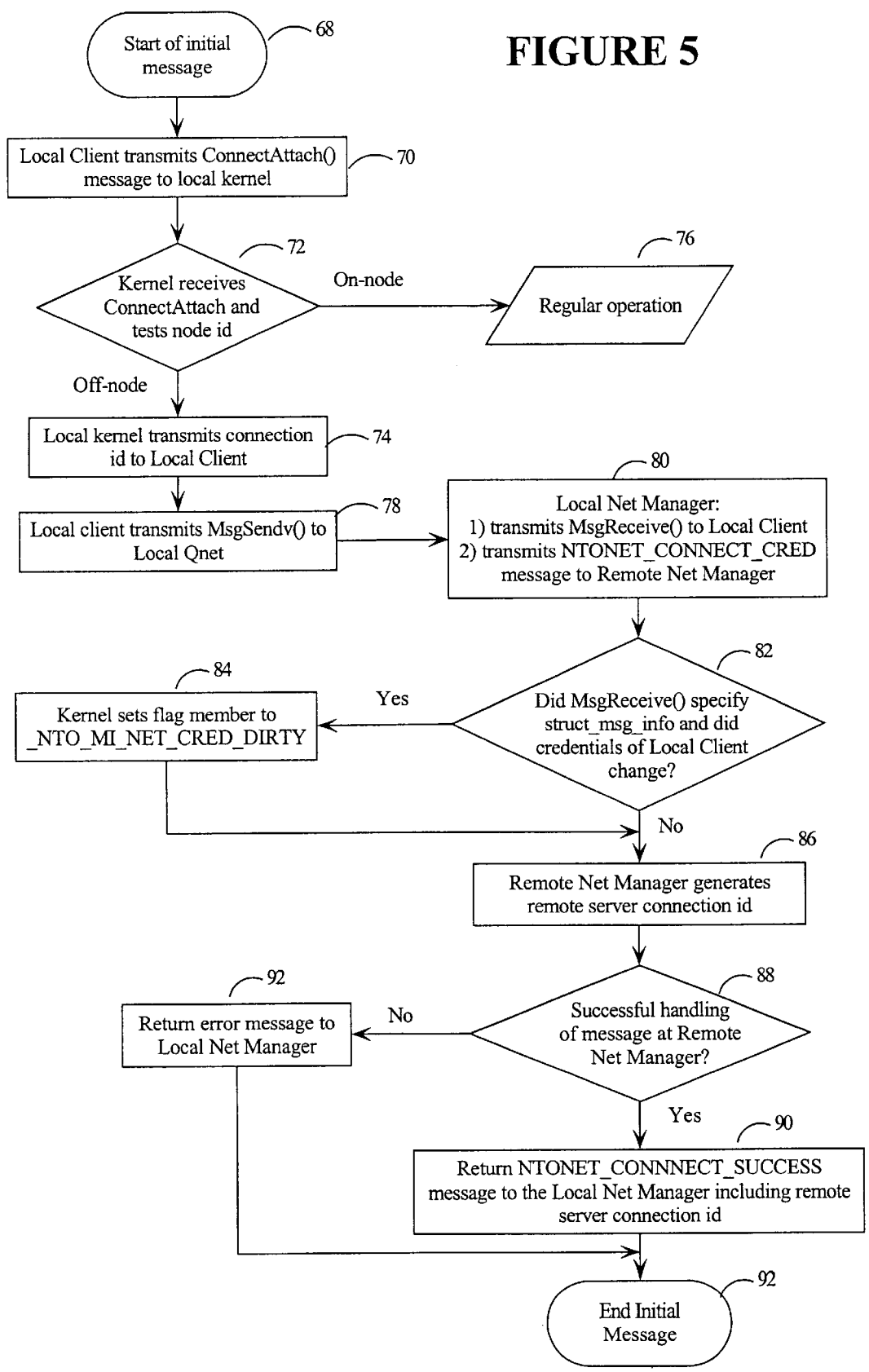
FIG. 5 presents a flow chart of the initial message routine for the Client side method in the preferred embodiment of the invention.
Figure 6:
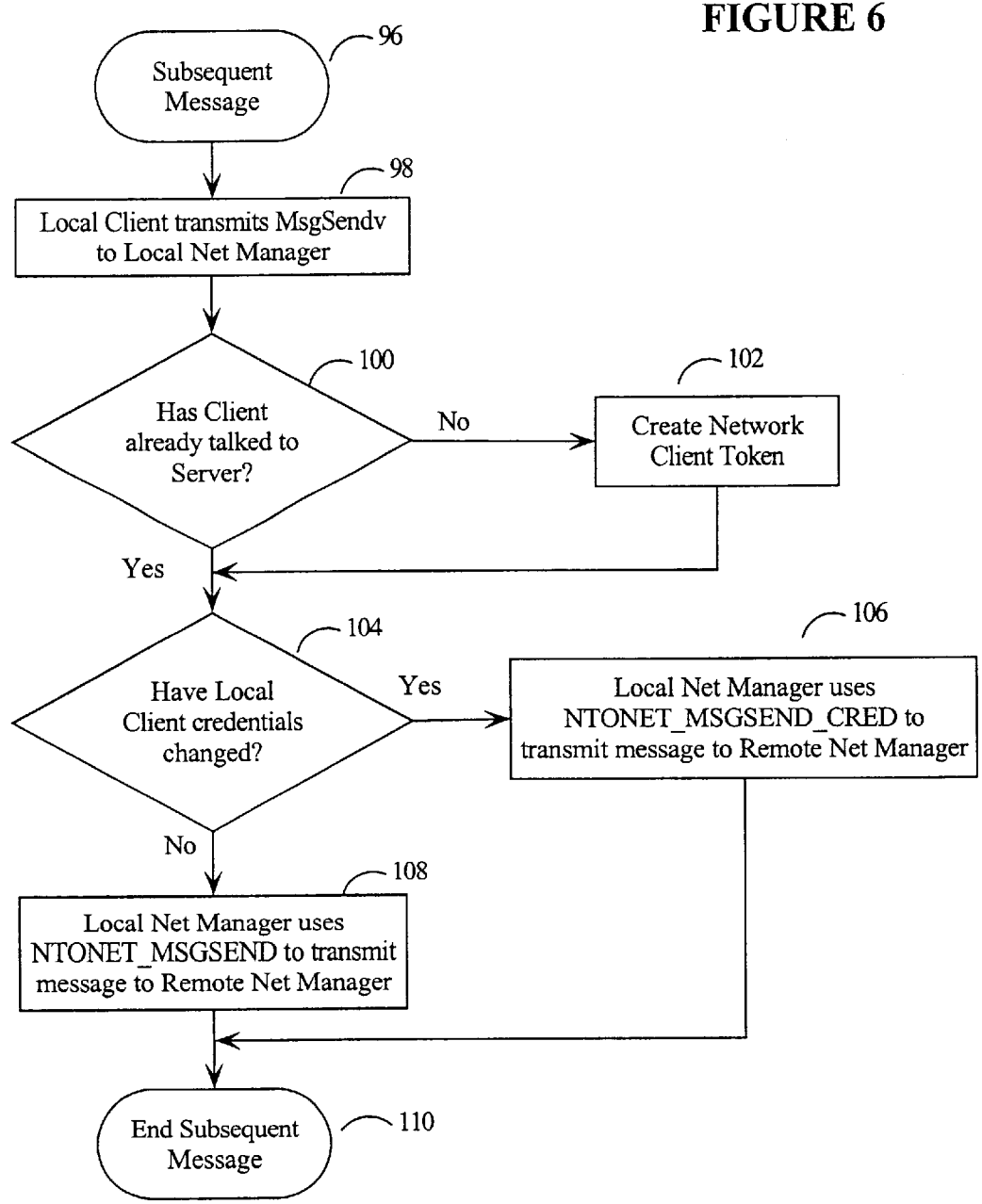
FIG. 6 presents a flow chart of a subsequent message routine for the Client side method in the preferred embodiment of the invention.

Operation of the Client Side 10 in the preferred embodiment of the invention is described with respect to FIGS. 4, 5 and 6. FIG. 4 presents in a flow chart, the steps that occur during initialization, starting at step 58. The Local Network Manager 24 has a standard channel on which it receives messages. In the preferred embodiment of the invention, this channel identification is created and identified to the kernel as the "network channel identification" when the Local Network Manager 24 issues a ChannelCreate( ) kernel call at step 60 containing a special flag indicating that it is a network manager.

At step 62, the local kernel creates the network channel 64 on the Local Network Manager 24. Generally such initializations are executed at the start or boot up of the system, but the initializations need not be executed until they are required. As well, other initializations are generally executed as part of this routine, such as variable declarations and the creation of other channels, but they are not pertinent to the invention. Thus, the initialization routine required for the Client side system 10 ends at step 66.

FIG. 5 presents a flow chart of the handling of an initial message on the Client System 10 in the preferred embodiment of the invention, starting with step 68. The local client processor 16 creates a connection to the Local Network Manager 24 by issuing a ConnectAttach( ) to the operating system kernel 18 at step 70, having a node identification (nid) that is non-zero and that is different than the local client processor's 16 node identification. The kernel 18 receives the ConnectAttach( ) call, and looks at the nid at step 72. If it is different from the kernel's 18 node identification, the local kernel transmits a connection identification (coid) to the Local Client 16 that points to the remote target with that off-node identification, but locally points at the Local Net-.Manager 24. This is done at step 74.

If the kernel identifies the node identification at step 72 to be non-network, which would be done by the local client processor 16 specifying a ConnectAttach( ) having a nid of either zero, or the value of the current node identification, a process identification (pid) and a channel identification (chid), the kernel would return an on-node connection identification (coid) at step 76. In either case, the kernel returns a connection identification (coid) to the local client processor 16 which allows the local client processor 16 to direct messages to the desired server.

In the off-node case, the local client processor 16 actually received a coid that allows it to communicate with the Local Net Manager 24. Any messages sent by the local client processor 16 will arrive at the Local Net Manager 24, and it will then be up to the Local Net Manager 24 to MsgReplyv() to the local client processor's 16 messages to unblock the local client processor 16. In effect, the Local Net Manager 24 acts as an intermediary between the local client processor 16 and the remote server 28, though the local client processor 16 sees Local Net Manager 24 as the destination.

Note that nothing happens when the local client processor 16 initially connects to the Local Net Manager 24 using the ConnectAttach( ). Only when the local client processor 16 actually sends a message using the MsgSendv( ) call at step 78, does the Local Net Manager 24 do anything.

In order for the messages exchanged by the Local Net Manager 24 and Remote Network Manager 30 to be delivered to the correct destination, both the Local Net Manager 24 and Remote Network Manager 30 must have at least indirect knowledge of the local client processor 16 and the remote server 28. This is performed via an internal handle and a receive ID.

At step 80, the receive ID is obtained by the Local Net Manager's 24 MsgReceivev( ) message when the local client processor 16 performs the MsgSendv( ). The receive ID is sent from the Local Net Manager 24 to the Remote Network Manager 30 via a NTONET_CONNECT_CRED message, and is then stored on the Remote Network Manager 30.

Note that the local client processor 16 is still Reply blocked at this point, awaiting a Reply from the local network manager 24. Also, note that the local client processor's 16 credentials were sent to the remote network manager 30 as part of the initial NTONET_CONNECT_CRED message.

"Credential" information is simply information about who the local client processor is, and may include a real user ID, an effective user ID, a saved user ID, a real group ID, effective group ID, saved group ID, number of groups or number of supplementary groups.

If the local client processor's 16 credentials change between the time that the connect message was sent and another message is sent, the Local Net Manager 24 must inform the Remote Network Manager 30 of that change. As part of the functionality of the ChannelCreate( )'s _NTO_ CHF_NET_MSG flag, the kernel 18 tracks changes to the local client processor's 16 credentials.

Whenever the Local Net Manager 24 performs a MsgReceivev( ) and specifies the struct_msg_info parameter at step 82, the kernel 18 will set the flag member to _NTO_MI_NET_CRED_DIRTY at step 84 if the local client processor's 16 credentials have changed. Note that this credential change flag is automatically cleared when read via MsgReceivev( ).

The Remote Network Manager 30 generates an internal handle for Its own use. The internal handle and the server connection ID from the Remote Network Manager 30 to the remote server 28 are returned in the reply message to the Local Net Manager 24 called NTONET_CONNECT_SUCCESS.

The scoid from the Remote Network Manager 30 to the remote server 28 is then stored by the Local Net Manager 24 in the local client processors 16 space via NetInfoscoid( ), for use later by functions such as ConnectServerInfo( ).

If the communication has been successful, as determined at step 88, then a NTONET_CONNECT_SUCCESS is returned to the Local network Manger 24 at step 90. Otherwise, an error message is returned at step 92. The routine for an initial message is then complete at step 94.

In the initial implementation of the invention, the entire message will be transferred from the Local Net Manager 24 to the Remote Network Manager 30, avoiding any complications on the Local Net Manager 24 and Remote Network Manager 30 sides. To do this, the lower transport layers are passed the rcvid from the local client processor 16, and it is up to those layers to fetch and transmit the local client processor's 16 data. After the data has been queued for transmission to the remote node, the Local Net Manager 24 returns to the MsgReceivev( ), awaiting the next message.

Conversely, when a message arrives from the Remote Network Manager 30, the network transport layer performs a call back to the Local Net Manager 24. It is up to the Local Net Manager 24 to MsgReplyv( ) with the message contents to the local client processor 16.

Although the Local Net Manager 24 and the Remote Network Manager 30 are being described as separate components, they may be identical, allowing two-way network communication. In such an implementation, there is no "server" or "client" version of the software; both client side 10 and server side 12 messages will arrive from the transport layer, and the MsgReceivev( ) will handle not only client requests, but server requests as well.

Subsequent messages are handled in the same manner, as outlined in the flow chart of FIG. 6, starting at step 96. When the local client processor 16 transmits a message to the Local Net Manager 24 at step 98, it will be routed via the connection and channel as described herein above. The Local Net Manager 24 will then determine at step 100 whether the local client processor 16 has already talked to the Local Net Manager 24.

If the local client processor 16 had not yet talked to the Local Net Manager 24, then a structure called a network client token (NCT) is created at step 102 that describes the local client processor 16 to the Local Net Manager 24. The NCT is filled with the true nid, pid, chid that the local client processor 16 was attempting to send the message to, as well as other information obtained from both network managers 24 and 30. This involves the NTONET_CONNECT_CRED message being exchanged between the two network managers 24 and 30. If there had already been communication then there will exist a network client token (NCT) that describes the local client processor 16 to the Local Net Manager 24.

The Local Net Manager 24 then determines whether the local client processor's 16 credentials have changed at step 104. If so, then the local net manager 24 will transfer a NTONET_MSGSEND_CRED to the remote net manager 30, including the revised credentials at step 106, rather than a NTONET_MSGSEND at step 108. The transfer of subsequent messages on the client side 10, then ends at step 110.

The Local Net Manager 24 performed a MsgReceivev( ) to await messages. One of the following messages will arrive: a message from a local client processor 16 intended for an off-node server 28, a pulse from a local client processor 16 to off-node server 28, or a pulse from the kernel 18. It is also possible to get a call back from the NETMGR (the low-level transport layer) as a result of a message from the Remote Network Manager 30 arriving.

Figure 7:
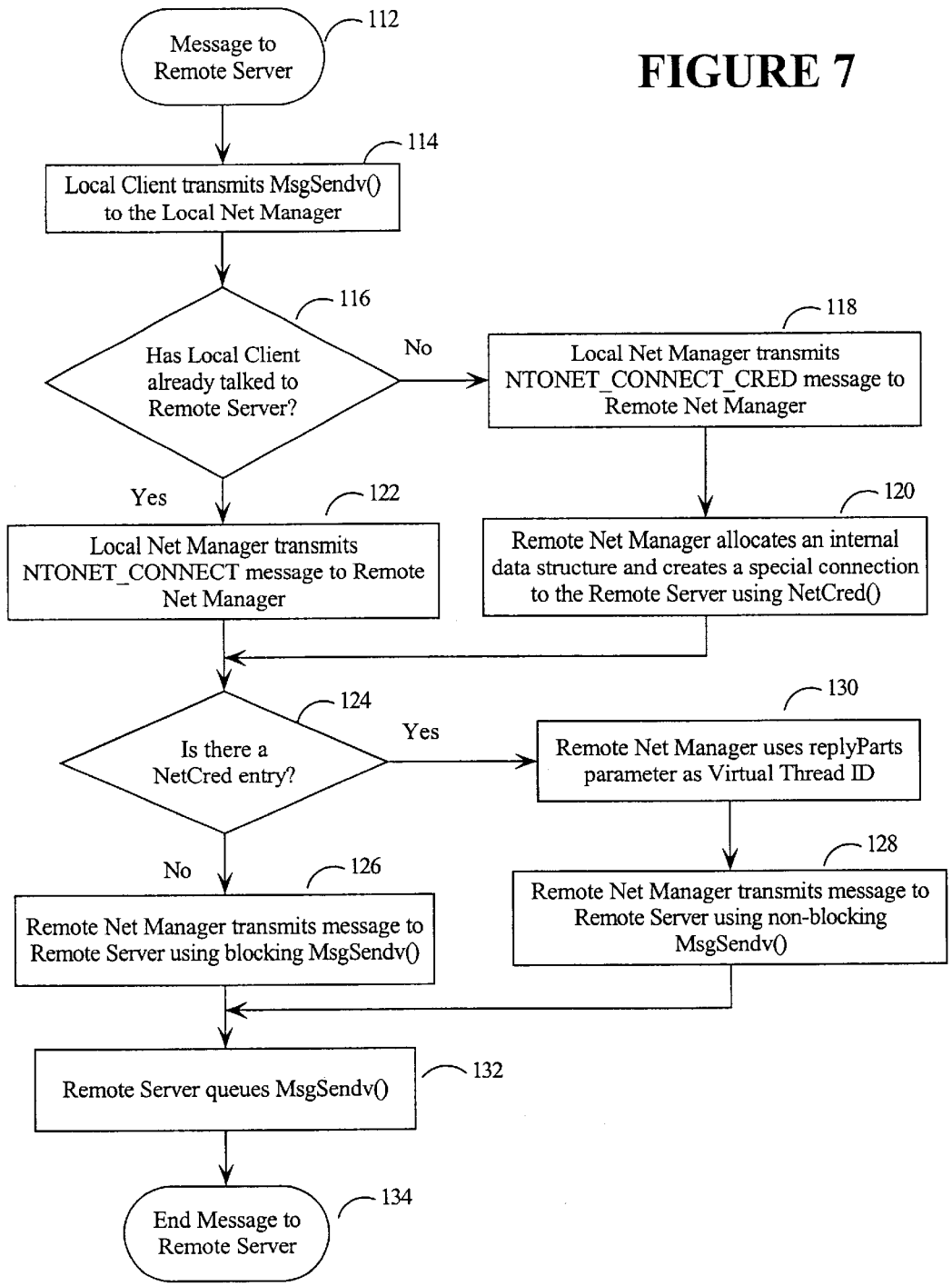
FIG. 7 presents a flow chart of an initial message routine between the Remote Network Manager and the Remote Server in the preferred embodiment of the invention.
Figure 8:
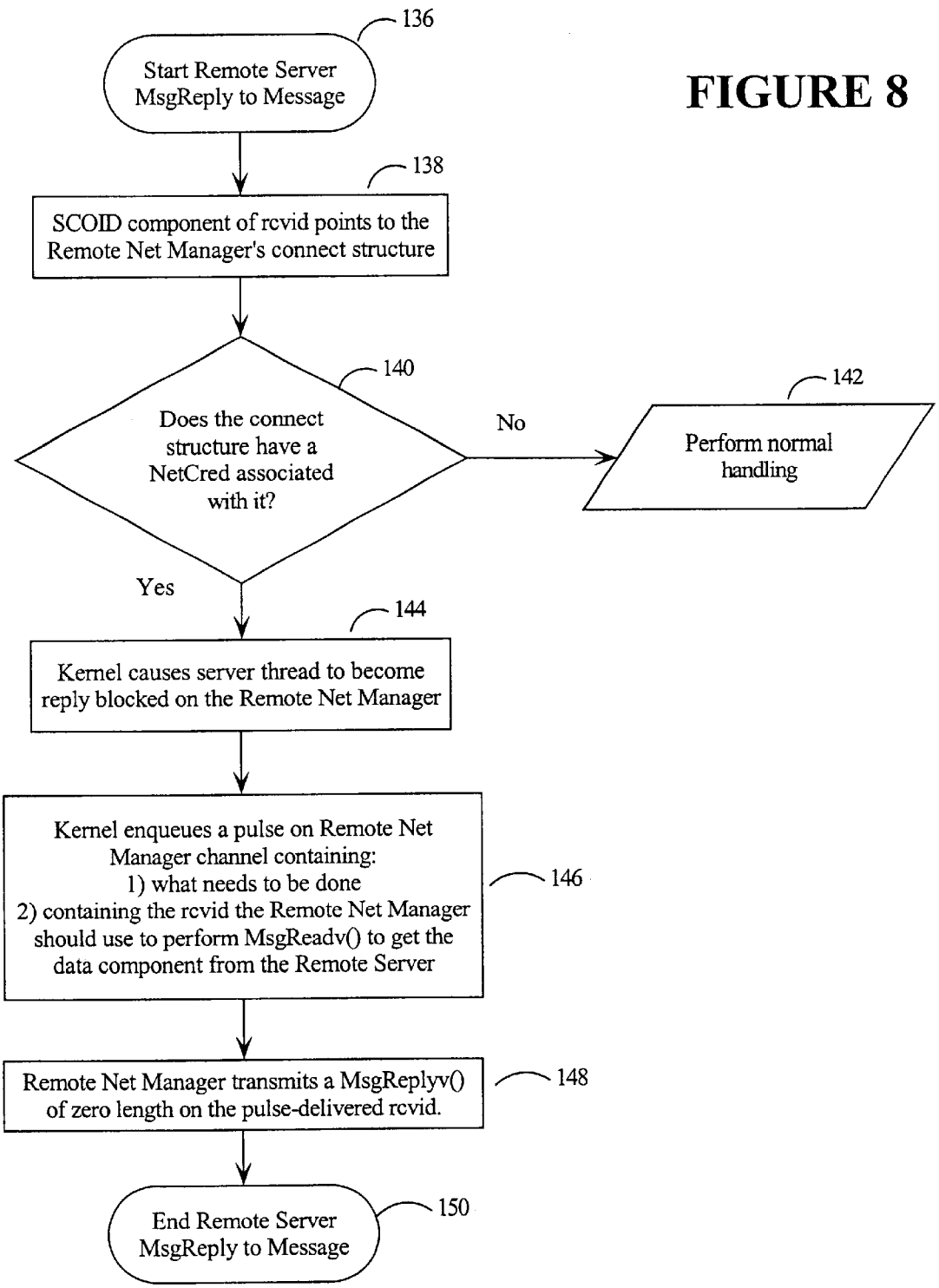
FIG. 8 presents a flow chart of an initial message routine between the Remote Server and Remote Network Manager in the preferred embodiment of the invention.

The preferred embodiment of the invention will now be described with respect to the Server Side 12 implementation, as shown in FIGS. 7 and 8.

While the local client processor 16 had to invoke ConnectAttach( ) with different values of node identification (noid) to establish a network or local connection, the remote server 28 does not have to do anything different to handle network versus local client connections. The only difference between local and network messages that the remote server 28 would be able to detect in a message is the value of the rcvid. In the local case the rcvid is actually a combination of the client's scoid and tid, while in the network case the rcvid contains the remote network manager's scoid and a virtual thread identification (VTID), which will be described hereinafter.

The Remote Network Manager 30 consists of a main message handling loop, and a transport layer call back. The main message handling loop is responsible for getting messages from the remote server 28 and the transport layer call back is responsible for getting messages from the Local Net Manager 24 over the communication network 14.

The Remote Network Manager 30 also has a special interface with the kernel 26 which it uses to convince the remote server 28 that it is the client. In order to handle multiple network accesses, the Remote Network Manager 30 must be identified as one client to one remote server, and another client for another server. There are a number of ways of accomplishing this, but the preferred method is the one which is most consistent with the known design of messaging passing operating systems.

In general, kernel calls that require the remote server 28 to obtain information or data about the local client processor 16 (and not the remote network manager 30) are either changed into messages, or are rerouted to get the information from a different location. The kernel calls that are different on the Server Side 12 may be summarized as follows:

MsgReceivev( )
    Not really different from the remote server's 28 perspective, but the corresponding MsgSendv( ) on the Remote Network Manager 30 is now a non-blocking call.

MsgWritev( )
    Data is not written to the Remote Network Manager 30 as would ordinarily be the case, but rather, the MsgWritevo is converted into a REPLY-blocking call that sends a pulse to the Remote Network Manager 30. The Remote Network Manager 30 then gets this pulse and performs the MsgWritev( ) functionality.

MsgDeliverEvent( )
    The kernel 26 converts the MsgDeliverEvent( ) call into a REPLY-blocking call that sends a pulse to the Remote Network Manager 30. The Remote Network Manager 30 then fetches the structure SigEvent from the Remote Server 28 and delivers it to the Local Net Manager 24, which then calls MsgDeliverEvent( ) locally.

MsgReplyv( )
    Since the Remote Network Manager's 30 MsgSendv( ) was non-blocking, special attention will be required for the MsgReplyv( ). It is converted into a REPLY-blocking call that sends a pulse to the Remote Network Manager 30, telling it that the remote server 28 has performed a Reply operation.

Referring now to FIG. 7, the preferred embodiment of the invention will be described with respect to a message being passed to the remote server 28 on the server side 12, starting at step 112.

As described above, the routine begins with the local client processor 16 sending a message via MsgSendv( ) to the Local Net Manager at step 114. If the Local Net Manager 24 determines that the local client processor 16 has never communicated with it before, it sends a NTONET_CONNECT_CRED message to the Remote Network Manager 30 to establish an identification for this session at step 118.

In response to this message, the Remote Network Manager 30 allocates an internal data structure, and creates a special connection to the remote Server 28 at step 120. This connection between the is special in two ways.

Firstly, calling NetC redo associates information about the local client processor 16 and the ultimate client process, within the connection itself. The NetCred( ) function effectively creates a netcred table entry which allows the kernel 26 to determine whether special handling versus regular handling should occur. Note that this table does not contain the per-thread information about the local client processor 16, but per-process information.

Secondly the Remote Network Manager 30 uses a _NTO_SIDE_CHANNEL flag to ensure that its connection ID to the remote server 28 allows a reply-reversed rcvid to be obtained from the kernel 26, to be constructed from the net_coid+server_TID that did the Reply. This allows the kernel 26 to convert the remote server's 28 MsgReplyv( ) and MsgWritev( ) messages into Send messages back to the Remote Network Manager 30, allowing the Remote Network Manager 30 to then use that rcvid for subsequent operations.

If the local net manager 24 determines at step 116 that prior communication had already been performed, then the internal data structure and special connection will already exist, so it is sufficient to pass the message on to the Remote Network Manager 30 using the NTONET_CONNECT message shown at step 122.

In either case, once the special connection has been established, the Remote Network Manager 30 is free to send a message to the remote server 28.

As noted above, in the preferred embodiment, the Remote Network Manager 30 has received the entire message into its buffers. Thus, when the Remote Network Manager 30 contacts the remote server 28 with the message, the Remote Network Manager 30 is prepared to transfer the entire message.

In order not to consume threads excessively, the MsgSendv( ) call was modified to detect whether or not it should block. If no netcred entry is identified at step 124, then the message will be considered to be local, and the MsgSendv( ) functions normally at step 126, Send blocking the thread at the Remote Network Manager 30.

If there is a netcred entry, then the message will be considered to be a network message, and the MsgSendv( ) from the Remote Network manager 30 to the remote server 28 at step 128 becomes non-blocking.

In order to send this message, the kernel 26 must be given an object or messaging agent that it can track, in order to enqueue the message onto the remote server 28. Therefore, for network message, a virtual thread identification (VTID) must be prepared at step 130. There will be one VTID for every nid/pid/tid/coid combination. Note that in the non-network, blocking MsgSendv( ) case, the tid of the sender would serve as the message agent.

Since the MsgSendv( ) is non-blocking, the two parameters replyIOV and replyParts ordinarily used for the reply, are available for other purposes. In this case, it is preferred that the replyParts be used to contain the VTID, though other parameters may be used.

The remote server 28 now receives the MsgSendv( ) and queues the message in the Send queue of the incoming channel for handling at step 132, and the routines ends at step 134.

Referring now to FIG. 8, the preferred embodiment of the invention will be described with respect to a message being returned from remote server 28 on the server side 12, starting at step 136.

The message returning from the remote server 28, MsgWritev( ), must travel to the local client processor 16, and not just the Remote Network Manager 30. The same condition applies to a MsgReplyv( ) from the remote server 28, with the additional condition that since the Remote Network Manager 30 never blocked the MsgSendv( ) to the remote server 28, the remote server 28 is not in a position to unblock the Remote Network Manager 30 via MsgReplyv(). The MsgReply( ) case will be described as it is more complex, and the MsgWritev( ) case follows logically from the same description.

When the remote server 28 transmits a MsgReplyv( ) to the rcvid at step 138, the scoid component of the rcvid points to the remote network manager's 30 connect structure.

If the remote network manager's 30 connect structure does not have a netcred associated with it at step 140, the kernel 26 will identify the message as a non-network message and cause normal execution to continue at step 142.

If the remote network manager's 30 connect structure does have a netcred associated with it at step 140, then the kernel 26 will identify the message as a network message and cause special handling to commence by causing the server thread to become Reply blocked on the Remote Network Manager 30 at step 144. This step effectively transforms the MsgReplyv( ) or MsgWritev( ) message from the remote server 28 into a REPLY blocked state, without actually transferring a message to the remote network manager 30.

At step 146, the kernel 26 then enqueues a pulse on the remote network manager's 30 channel telling it that something needs to be done. A pulse is a fixed-size, non-blocking message that carries a small payload, typically four bytes of data plus a single byte code, and are generally used as a notification mechanism within interrupt handlers. They may also allow servers to signal clients without blocking on them.

The queued pulse contains information about what needs to be done, and also contains the rcvid that the Remote Network Manager 30 should use to perform MsgReadv( ) to get the data component from the remote server 28.

At step 148, the Remote Network Manager 30 then transmits a MsgReplyv( ) to the remote server 28 on the pulse-delivered rcvid. This MsgReplyv( ) is of zero length, as there is no need to transfer data. The routine is then complete at step 150.

The Remote Network Manager 30 knows where to forward the actual reply data to because of the VTID, which was contained in the struct _msg_info (coid member) sent as a result of the pulse. The VTID contains per-client-thread information telling it where to go.

The messages referred to herein, may be summarized as follows:

Connection Oriented Messages which are used to administer communication between the Local Network Manager 24 and the remote network manager 30:

NTONET_CONNECT_CRED

Used to establish a connection from a local client processor 16 on the Local Net Manager 24 to a remote server 28 on the Remote Network Manager 30, passing the local client processor's 16 credentials.

NTONET_CONNECT_SUCCESS

Used to indicate a successful response to the NTONET_CONNECT_CRED message.

NTONET_CONNECT_FAIL

This message is used to indicate an unsuccessful response to the NTONET_CONNECT_CRED message.

NTONET_DISCONNECT

Indicates local client processor 16 has disconnected from the Local Net Manager 24.

Pulse Transport Messages which are used to carry events that would have been delivered by the kernel locally to the indicated target in the non-networked case. In the network case this data must be transmitted over the communication network 14, and then deliver it in a manner identical to the local case.

NTONET_EVENT
  Used to send a message from the Remote Server 28 back to the local client processor 16 without blocking.
NTONET_UNBLOCK
  Used to indicate what the new state of the thread is that was just unblocked, therefore requiring a status to be returned. This message could indicate, for example, whether the remote server 28 actually did allow the unblock to occur.
Data Transport Messages which actually transfer message data:
NTONET_MSGSEND
  This is what the local client processor's 16 MsgSendv( ) data is carried by to the remote server 28.
NTONET_MSGSEND_CRED
  Same as NTONET_MSGSEND, but also transfers the local client processor's 16 credentials. This would typically be used if the local client processor 16 changed credentials after the Local Net Manager 24 sent the initial message (the NTONET_CONNECT_CRED) to the Remote Network Manager 30.
NTONET_MSGREPLY
  This is used to carry the data from the remote server 28 back to the local client processor 16, and is invoked as part of the Remote Network Manager 30 handling of the remote server's 28 MsgReplyv( ).
NTONET_MSGREAD
  The Remote Network Manager 30 uses this message to satisfy the remote server's 28 MsgReadv( ) call, by requesting additional data from the local client processor 16.
NTONET_MSGREAD_SUCCESS
  Indicates to the Remote Network Manager 30 that the Local Net Manager 24 was able to return data as a result of the SS's NTONET_MSGREAD, and contains the data.
NTONET_MSGREAD_FAIL
  Indicates to the Remote Network Manager 30 that the Local Net Manager 24 was unable to return data as a result of the Remote Network Manager's 30 NTONET_MSGREAD message.
NTONET_MSGWRITE
  This is what the Remote Network Manager 30 sends in order to satisfy the server's MsgWritev( ) call, by transferring data from the server's buffers to the local client processor 16.
Receiving and Processing Pulses are fixed-sized non-blocking messages which carry a small payload. They are generally used as a modification mechanism within interrupt handlers. They also allow servers to signal clients without blocking on them. Since a pulse will only be arriving from the kernel, the Local Net Manager 24 knows that it can only be one of the following:
_PULSE_CODE_DISCONNECT
  For all handles that were associated with the local client processor 16, send network messages to the Remote Network Manager 30 stating that each NCT has disconnected. Remove the NCTs from the Local Net Manager's 24 table. In case there were any messages queued in the Local Net Manager 24 to go out the network connection 14, these are dequeued and MsgReplyv( )'d to with an error return code.
_PULSE_CODE_UNBLOCK
  If the local client processor 16 currently has an NCT (meaning that there exists that client/server pair), and if there is an outgoing queued message for that particular rcvid dequeue the message and MsgReplyv( ) to the local client processor 16. If there is an NCT, but no queued message for that rcvid, send a NTONET_UNBLOCK message to the Remote Network Manager 30, because by definition, we know that there is an outstanding message at the server side 12.

Optionally, the method and system of the invention may be implemented with additional features not specifically described herein. In view of the invention as disclosed, it would be clear to one skilled in the art how to incorporate these additional features and options. Such features could include:

1. Real time implementation. Because the invention requires very little additional code and requires little additional time to execute, the invention is easily applied to real time implementations.
  For a real time implementation, it would be preferred to include the thread scheduler in the operating system kernel. Because the time required for kernel calls is so short, the small reduction in accessibility to the kernel would be made up for by the improved speed of execution in having the thread scheduler in the kernel.
2. Updating cache data only when other transmissions are made. Since updated cache data is only needed when a new transmission is made, it is not necessary to continuously update the cache data. Instead, the cache can be updated by including the update with the next new transmission.
3. Network acknowledgements are also a burden to network communication. Rather than consuming network resources by continuously transmitting updates, such data may be transmitted along with other network traffic. If a large number of network acknowledgements are outstanding, they may be collected and transmitted as a single batch acknowledgement, again saving network resources.
4. Reply messages may be used as the only means of messaging to avoid being Receive blocked on Send messages.
5. Addresses may be defined as 128 bits so that they are compatible with IPv6 internet addressing. This would allow network addresses to use standard internet Universal Resource Locators (URLs) and their associated features.

While particular embodiments of the present invention have been shown and described, it is clear that changes and modifications may be made to such embodiments without departing from the true scope and spirit of the invention. For example, modifications to larger or monolithic operating systems could be made to apply the teachings of the invention and realize performance improvements. As well, hybrids of the message passing system of the invention with existing operating systems may be appropriate to particular applications.

The operating system of the invention could be embedded into a micro controller, digital signal processor or intelligent instrumentation, operating as a piece of electronic hardware or as part of the electronic system. The invention could also be implemented in the form of machine executable software; the method of the invention being transmitted as electronic signals, or stored in machine readable or executable form in random access memory (RAM), read only memory (ROM), optical disk (CD-ROM) or magnetic storage media (hard drive or portable diskette).

An operating system in a manner of the invention could be applied to a broad range of applications, including stand-alone uniprocessor systems, multiprocessor or network-connected systems, servers, palm top or laptop computers, cellular telephones, automobile controllers and smart process control instruments. Since the invention offers the best possible utilization of available CPU cycles, it's ideal for very high-end real-time applications such as high-capacity telecom switches, image processing, and aircraft simulators.

Again, such implementations would be clear to one skilled in the art, and do not take away from the invention.

What is claimed is:

1. A method of implementing a distributed message-passing operating system between a local network and a remote network via a communication network interconnecting said local network and said remote network, comprising the steps of:
   at said local network:
   generating an inter-process control message;
   responding to said inter-process control message having an off-node destination by:
      forwarding said inter-process control message to said remote network corresponding to said off-node destination via said communication network; and
   at said remote network:
   responding to the receipt of said inter-process control message by:
      generating a virtual message based on said inter-process control message, which identifies a process on said remote network as a client to the process said inter-process control message is addressed to; and
      forwarding said virtual message to said process which said inter-process control message is addressed to.

2. The method as claimed in claim 1, wherein said step of forwarding further comprises the step of including local network credentials with said generated message.

3. The method as claimed in claim 2, wherein said step of responding to said inter-process control message having an off-node destination comprises the step of responding to said generated message having a destination that does not correspond to an on-node address, by default, to be an off-node address.

4. The method as claimed in claim 3, wherein:
   said step of generating an inter-process control message comprises the step of generating an inter-process control message at a local client;
   said step of forwarding said inter-process control message comprises the step of:
      transmitting said generated message from said local client to a local network manager; and
      transmitting said generated message from said local network manager to said remote network corresponding to said off-node destination via said communication network.

5. The method as claimed in claim 4, further comprising the step of responding to an initial transmission between said local client and said local network manager by creating a connection between said local client and said local network manager.

6. The method as claimed in claim 5, further comprising the step of responding to an initial transmission between said local network manager and said remote network by transmitting local client information to said remote network.

7. The method as claimed in claim 6, wherein said communication network includes an Internet network, and said step of transmitting said generated message from said local network manager to said remote network comprises the step of transmitting said generated message from said local network manager to said remote network corresponding to said off-node destination via said Internet network.

8. The method as claimed in claim 1, wherein said inter-process control message is addressed to a remote server, and:
   said step of responding to the receipt of said inter-process control message comprises the step of responding to the receipt of said inter-process control message at a remote network manager;
   said step of generating a virtual message comprises the step of generating said virtual message at said remote network manager, where said virtual message identifies said remote network manager as a client to said remote server; and
   said step of forwarding said virtual message comprises the step of forwarding said virtual message from said remote network manager to said remote server.

9. The method as claimed in claim 8, further comprising the step of:
   said remote network manager preparing a record of said generated virtual message, allowing said remote network manager to properly address a message returned from said remote server, to a process on said local network, said process on said local network being the process which originated said message received via said communication network.

10. The method as claimed in claim 9, wherein said step of preparing a record comprises the step of preparing a record of said generated virtual message containing client credentials.

11. The method as claimed in claim 10, further comprising the step of:
    responding to a generated virtual message, by an operating system kernel on said remote network generating and appending a virtual thread identification (VTID) to said virtual message, in order to properly enqueue said virtual message on said remote server.

12. The method as claimed in claim 11, further comprising the steps of:
    responding to an initial transmission between a local network manager and said remote network by said remote network manager:
       allocating an internal data structure containing per-process information; and
       creating a special connection to said remote server.

13. The method as claimed in claim 12, further comprising the step of:
    responding to either a message reply or message write from said remote server passing over said special connection, by a kernel on said remote network converting either of said message reply or message write into a send message back to said remote network manager.

14. The method as claimed in claim 13, wherein said communication network includes an Internet network, and said step of responding to the receipt of said inter-process control message comprises the step of responding to the receipt of said inter-process control via said Internet network.

15. A method of implementing a distributed operating system between a local client processor on a local network having a local message passing operating system and a local network manager and a remote server processor on a remote network having a remote message passing operating system and a remote network manager via a communication network interconnecting said local network and said remote network, comprising the steps of:

said local message passing operating system responding to an inter-process control message generated by said local client processor having an off-node destination by creating a connection between said local client processor and said local network manager;

said local client processor transmitting said inter-process control message to said local network manager via said connection;

said local network manager transmitting said inter-process control message and credentials of said local client processor to said remote network manager corresponding to said off-node destination via said communication network; and said remote network manager responding to an off-node message being received by forwarding a virtual message to said remote server, said virtual message identifying a process on said remote network as a client to the process said inter-process control message is addressed to.

16. An apparatus for implementing a distributed message-passing operating system comprising:

means for generating an inter-process control message;

means for responding to said inter-process control message having an off-node destination by:

forwarding said inter-process control message to a remote network corresponding to said off-node destination via a communication network; and means for responding to the receipt of an inter-process control message from a remote network by:

generating a virtual message based on said inter-process control message, which identifies a process on said remote network as a client to the process said inter-process control message is addressed to; and forwarding said virtual message to said process which said inter-process control message is addressed to.

17. A computer readable memory medium, storing computer software code executable to perform the steps of:

generating an inter-process control message;

responding to said inter-process control message having an off-node destination by:

forwarding said inter-process control message to a remote network corresponding to said off-node destination via a communication network; and responding to the receipt of an inter-process control message from a remote network by:

generating a virtual message based on said inter-process control message, which identifies a process on said remote network as a client to the process said inter-process control message is addressed to; and forwarding said virtual message to said process which said inter-process control message is addressed to.

18. A computer data signal embodied in a carrier wave, said computer data signal comprising a set of machine executable code executable by a computer to perform the steps of:

generating an inter-process control message;

responding to said inter-process control message having an off-node destination by:

forwarding said inter-process control message to a remote network corresponding to said off-node destination via a communication network; and responding to the receipt of an inter-process control message from a remote network by:

generating a virtual message based on said inter-process control message, which identifies a process on said remote network as a client to the process said inter-process control message is addressed to; and forwarding said virtual message to said process which said inter-process control message is addressed to.

\* \* \* \* \*